US007944508B1

(12) United States Patent
Chou

(10) Patent No.: US 7,944,508 B1
(45) Date of Patent: May 17, 2011

(54) METHOD AND SYSTEM FOR AUTOMATIC DETECTION AND SUPPRESSION OF CROSS-LUMA AND CROSS-COLOR IN A COMPONENT VIDEO SIGNAL

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 1012 days.

(21) Appl. No.: 11/760,108

(22) Filed: Jun. 8, 2007

(51) Int. Cl.
*H04N 5/00* (2011.01)

(52) U.S. Cl. ........ 348/624; 348/701; 348/706; 348/305; 382/165

(58) Field of Classification Search .................. 382/167, 382/275, 274, 162, 163, 164, 165, 166, 103, 382/260; 348/441–459, 533, 606–624, 649–670
See application file for complete search history.

(56) References Cited

U.S. PATENT DOCUMENTS 4,706,112 A * 11/1987 Faroudja et al. .............. 348/666
4,731,660 A 3/1988 Faroudja et al.
5,305,120 A 4/1994 Faroudja
5,502,509 A * 3/1996 Kurashita et al. ............. 348/669
7,271,850 B2 * 9/2007 Chao ............................ 348/609
7,460,180 B2 * 12/2008 Chao ............................ 348/624
7,697,075 B2 * 4/2010 Zhu .............................. 348/609
2005/0157789 A1 * 7/2005 Chao ........................ 375/240.12
2005/0280740 A1 * 12/2005 Chao ............................ 348/624
2006/0017854 A1 * 1/2006 Chao ............................ 348/624
2006/0092331 A1 5/2006 Zhu
2006/0092332 A1 * 5/2006 Zhu .............................. 348/624
2006/0152631 A1 7/2006 Chang
2006/0176405 A1 * 8/2006 Chen ............................ 348/638
2006/0181648 A1 * 8/2006 Park et al. ..................... 348/670
2007/0024761 A1 * 2/2007 Chang ........................... 348/706
* cited by examiner

*Primary Examiner* — Brian Q Le
*Assistant Examiner* — Mekonen Bekele
(74) *Attorney, Agent, or Firm* — Dergosits & Noah LLP; Joyce Tom

(57) ABSTRACT

A method for automatically detecting and suppressing cross-color and cross-luma present in a baseband component video signal includes receiving component pixel data of a current pixel, a first previous pixel and a second previous pixel. First, second and third differences are calculated based on the component pixel data of the current, first previous and second previous pixels, and the presence of cross-luma and/or cross-color is determined for the current pixel based on an absolute value of at least one of the first, the second and the third differences. A per pixel count associated with the component pixel data of the current pixel is determined based on the determined presence of at least one of cross-luma and cross-color, and the component pixel data of the current pixel is modified based on the per pixel count. The modified component pixel data of the current pixel is outputted as a corrected output color video signal, where the corrected output color video signal is substantially without visual artifacts caused by the at least one of cross-luma and cross-color.

22 Claims, 10 Drawing Sheets

METHOD AND SYSTEM FOR AUTOMATIC DETECTION AND SUPPRESSION OF CROSS-LUMA AND CROSS-COLOR IN A COMPONENT VIDEO SIGNAL

FIELD OF THE INVENTION

The present invention relates in general to digital image and video signal processing and in particular to a method and system for automatically detecting and suppressing cross-luma and cross-color artifacts in a video signal.

BACKGROUND

World wide analog video standards, such as NTSC and PAL, use interlaced video formats to maximize the vertical refresh rates while minimizing the required transmission bandwidth. In an interlaced video format, a video frame includes a plurality of pixels that are arranged in a plurality of horizontal scan lines. Each frame is split into two video fields. The first of the two fields includes the pixels located in the odd numbered horizontal scan lines, while the second field includes the pixels located in the even numbered scan lines. The interlaced video fields are transmitted sequentially in temporal order to a display system, thereby minimizing the transmission bandwidth.

Typically, a component video signal includes a luma component and chroma components. The luma component represents brightness or luminance information, while the chroma components represent color information, e.g., as color differences, Cb and Cr. The luma component signal and the chroma component signals can be combined to form a composite video signal to minimize further the bandwidth requirements for transmission and to simplify transmission. Both the NTSC and PAL analog video standards support and transmit composite video signals.

In the typical composite video signal, the chroma components are quadrature-modulated. That is, one component of the chroma signal, e.g., Cb, has a different amplitude and is 90 degrees out-of-phase with the other component of the chroma signal, e.g., Cr. The rationale for modulating the chroma subcomponent signals and combining the modulated chroma signal with the baseband luma signal to form a composite video signal is based on the frequency interleaving principle, which provides that both the modulated chroma and baseband luma signal spectra contain individual spectrum lines for stationary video and that those spectrum lines of modulated chroma and baseband luma signals will interleave with each other without overlapping when an appropriate subcarrier frequency is chosen.

During transmission, the quadrature-modulated chroma signal and the baseband luma signal share a portion of the total video signal bandwidth. For example, in NTSC (M) systems, the chroma signal is modulated on a subcarrier frequency of 3.579545 MHz. The chroma signal and luma signal are intermingled within the modulated chroma signal band which extends from roughly 2.3 MHz to 4.2 MHz. In PAL (B/D/G/H/K/N) systems, the chroma signal is modulated on a subcarrier frequency of 4.43361875 MHz. The chroma signal and luma signal are intermingled within the modulated chroma signal band which extends from roughly 3.1 MHz to 5.0 MHz.

When the composite video signal is received by the display system, the signal is decoded by a decoder that separates the modulated chroma signal and the luma signal from the composite signal. One technique for separating the modulated chroma and the luma signals uses a combination of a notch filter passing the luma signal and a bandpass filter passing the modulated chroma signal. Because the filtering of the modulated chroma and the luma signals is performed only in the horizontal domain, this decoding technique is usually called notch filter luma/chroma (Y/C) separation. The modulated chroma signal is subsequently quadrature-demodulated into the two chroma components such as, for example, I and Q signals, or U and V signals. The luma component and the two chroma components can be used in a matrix computation to generate red, green, and blue (RGB) signals when the display system is a television display system.

Another technique for separating the modulated chroma signal and the luma signal uses adaptive line comb filters, i.e., comb filters in the vertical domain using line buffers. This technique is based on the premise that, in a quadrature-modulated composite video signal, the luma signal energy in the vicinity of the modulated chroma band is most probably located near harmonics of the horizontal scanning frequency, while the modulated chroma signal energy is located half horizontal scanning frequency between the luma signal energy peaks for NTSC (M) systems, and one quarter and three quarters horizontal scanning frequency between the luma signal energy peaks for PAL (B/D/G/H/K/N) systems, depending on the relationship between the subcarrier frequency and horizontal scanning frequency. According to this technique, the chroma and luma signals are adaptively averaged across successive scan lines using comb filters based on the presence of vertical transitions in the composite video signal to prevent blurring of the chroma or luma signals in the vertical domain. Because the filtering of chroma and luma signals is done in both the horizontal and vertical domains, this technique is usually called 2-D comb filter Y/C separation, and works particularly well when the luma signal energy is concentrated around harmonics of the horizontal scanning frequency or when the luma signal features are vertical or substantially vertical.

Yet another technique for separating the luma signal from the modulated chroma signal uses motion adaptive frame comb filters, i.e., comb filters in the temporal domain using frame buffers. According to this technique, when motion is detected in the temporal domain, the chroma and the luma signals are adaptively averaged across successive video frames to prevent blurring of chroma or luma signals in the temporal domain. In addition, when vertical transitions within a frame are detected, the chroma and the luma signals are adaptively averaged across scan lines using comb filters to prevent blurring of chroma or luma signals in the vertical domain. Because the filtering of chroma and luma signals is done in the horizontal, vertical, and temporal domains, this technique is usually called 3-D comb filter Y/C separation.

As stated above, the rationale for modulating the chroma components and combining the modulated chroma signal with the luma signal to form a composite video signal is based on the frequency interleaving principle. Nevertheless, the frequency interleaving principle is not applicable for moving video and/or video containing fine diagonal lines. In these cases, the modulated chroma signal spectrum and the luma signal spectrum can and often do overlap with one other. The result is that some degree of mutual interference, i.e., cross-talk, between the luma signal spectrum and chroma signal spectrum can occur.

The term "cross-color" refers to corruption of the modulated chroma signal spectrum caused by cross-talk from the high-frequency luma signal spectrum. When a composite video signal having cross-color is decoded with either a notch filter or a line comb filter, the cross-color can cause visual artifacts that can appear as a coarse rainbow pattern or random colors in image areas having dense diagonal fine lines, such as tiled rooftops, laminated fences, herringbone patterned clothing, and leafy scenery. The term "cross-luma" refers to corruption of the high-frequency luma signal spectrum caused by cross-talk from the modulated chroma signal spectrum. When a composite video signal having cross-luma is decoded with either a notch filter or a line comb filter, the cross-luma can cause visual artifacts that can appear as fine alternating dark and bright dots in image areas having abrupt chroma transitions, such as at the boundaries of contrasting colors, like blue and yellow.

While the visual artifacts caused by cross-color and cross-luma might be tolerable when displayed on a legacy television having a small screen with low brightness and low resolution, such artifacts are highly objectionable when displayed on a modern television having a large screen with high brightness and high resolution. Moreover, the cross-color and cross-luma problems are exacerbated when an advanced image scaling function, typically included in a modern television, enlarges video from a composite video source onto the large-size display with high resolution. In such modern systems, reducing or eliminating cross-color and cross-luma artifacts is highly desirable.

While decoding systems that use notch filter Y/C separation and 2-D comb filter Y/C separation techniques fail to reduce or eliminate cross-color and cross-luma artifacts, decoding systems that use 3-D comb filter Y/C separation techniques can reduce such artifacts in certain situations. For example, because filtering is performed in the horizontal, vertical, and temporal domains, the cross-color and/or cross-luma artifacts can be reduced in stationary portions of an image, such as over fine diagonal lines and along sharp vertical chroma transitions. Nevertheless, implementing a decoder that uses adaptive 3-D frame comb filters can be significantly more expensive then one that uses notch filters or line comb filters because the decoder requires motion detectors and frame buffers. Moreover, because the technique is based on motion detection in the temporal domain, actual motion in the image can be mistakenly interpreted as cross-color and/or cross-luma, and vice versa. In this case, improper filtering can itself produce serious cross-color and cross-luma artifacts.

Other systems for suppressing cross-color and/or cross-luma artifacts implement adaptive cross-color and/or cross-luma suppression techniques that operate only upon modulated chroma signals prior to demodulation. While these systems can be effective when the input signal is a composite video signal, they cannot be used to suppress cross-color and/or cross-luma artifacts in de-modulated baseband component signals. This shortcoming is significant because many modern digital devices are configured to process baseband component signals in the form of one luma (Y) signal and two color differences (Cb and Cr) signals. Such signals are received from, for example, a digital TV (DTV) tuner or a DVD player connected through a serial or parallel digital interface conveying YCbCr component signals. These baseband component signals can exhibit cross-color and/or cross-luma artifacts when the source of the content is taken from a composite video master. In this case, cross-color and/or cross-luma artifacts in the composite video master are irreversibly imprinted and any signals derived from the master necessarily inherit the cross-color and/or cross-luma errors and the associated visual artifacts.

In addition, even when the content source is not taken from a composite video master, the baseband component signals of a video signal can exhibit cross-color and/or cross-luma artifacts when the original component video signal is converted to a composite format during any stage of video processing, such as during production, distribution, transmission, and so forth. In both cases, cross-color and cross-luma detection and suppression must be performed directly on the baseband component signals in order to reduce the objectionable artifacts.

Accordingly, it is desirable to provide a method and system for detecting and suppressing the cross-color and cross-luma present in a baseband component video signal derived from a quadrature-modulated composite video signal. The system should be cost effective and should not require extensive computational and storage resources.

SUMMARY

A method and system for automatically detecting and suppressing the cross-color and cross-luma present in a baseband component video signal is described. In one aspect, the method includes receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame. The method further includes calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, and determining for the current pixel whether at least one of cross-luma and cross-color is present based on an absolute value of at least one of the first difference, the second difference and the third difference. A per pixel count associated with the component pixel data of the current pixel is determined based on the determined presence of at least one of cross-luma and cross-color, and the component pixel data of the current pixel is modified based on the per pixel count associated with the component pixel data of the current pixel. The method includes outputting the modified component pixel data of the current pixel as a corrected output color video signal, where the corrected output color video signal is substantially without visual artifacts caused by the at least one of cross-luma and cross-color.

In another aspect, a system for automatically detecting and suppressing cross-color and cross-luma present in a baseband component video signal includes means for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, where the second frame temporally precedes the first frame, which temporally precedes the current frame. The system further includes means for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, and means for determining for the current pixel whether at least one of cross-luma and cross-color is present based on an absolute value of at least one of the first difference, the second difference and the third difference. The system further includes a means for determining a per pixel count associated with the component pixel data of the current pixel based on the determined presence of at least one of cross-luma and cross-color, and a means for modifying the component pixel data of the current pixel based on the per pixel count associated with the component pixel data of the current pixel. The system further includes means for outputting the modified component pixel data of the current pixel as a corrected output color video signal, where the corrected output color video signal is substantially without visual artifacts caused by the at least one of cross-luma and cross-color.

In another aspect, a system for automatically detecting and suppressing the cross-color and cross-luma present in a baseband component video signal includes a correction unit configured for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame. The system also includes a detection unit configured for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, for determining for the current pixel whether at least one of cross-luma and cross-color is present based on an absolute value of at least one of the first difference, the second difference and the third difference, and for determining a per pixel count associated with the component pixel data of the current pixel based on the determined presence of at least one of cross-luma and cross-color. The system also includes a suppression unit configured for modifying the component pixel data of the current pixel based on the per pixel count associated with the component pixel data of the current pixel, and for outputting the modified component pixel data of the current pixel as a corrected output color video signal, wherein the corrected output color video signal is substantially without visual artifacts caused by at least one of cross-luma and cross-color.

In yet another aspect, a progressive scan display system includes a signal receiving unit, a tuner box for transforming the signal into an analog signal, a video decoder for transforming the analog signal into an interlaced component video signal comprising component pixel data, and a motion adaptive de-interlacing system for converting the interlaced component video signal into a progressive component video signal. The de-interlacing system includes a cross-color and cross-luma correction unit configured for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, where the second frame temporally precedes the first frame, which temporally precedes the current frame, a detection unit configured for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, for determining for the current pixel whether at least one of cross-luma and cross-color is present based on an absolute value of at least one of the first difference, the second difference and the third difference, and for determining a per pixel count associated with the component pixel data of the current pixel based on the determined presence of at least one of cross-luma and cross-color. The de-interlacing system also includes a suppression unit configured for modifying the component pixel data of the current pixel based on the per pixel count associated with the component pixel data of the current pixel, and for outputting the modified component pixel data of the current pixel as a corrected output color video signal, where the corrected output color video signal is substantially without visual artifacts caused by at least one of cross-luma and cross-color. The progressive scan display system includes a display for displaying the progressive video signal.

DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Methods and systems for automatically detecting and suppressing cross-color and cross-luma present in a baseband component video signal are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to an exemplary embodiment, a cross-color/cross-luma (CC/CL) correction unit is configured to receive a component video signal including chroma pixel data and the luma pixel data. The CC/CL correction unit analyzes the chroma pixel data and the luma pixel data to detect cross-color and cross-luma, respectively. In one embodiment, the detection is based on differences between the pixel data of a current pixel located in a specific position in a current video frame and the pixel data of at least two other pixels located in the same position in at least two other preceding frames. When detected, the cross-color and/or cross-luma are suppressed by the CC/CL correction unit such that the resulting component video signal can be correctly processed downstream and displayed substantially without swirling rainbows, crawling dots, and other artifacts due to cross-color and cross-luma. The CC/CL correction unit can be implemented for a television, a video receiver, a video recorder, a set-top box (STB), or for any other video processing device for the production, distribution, transmission, reception, scan format conversion, and display of a baseband component video signal.

Figure 1:
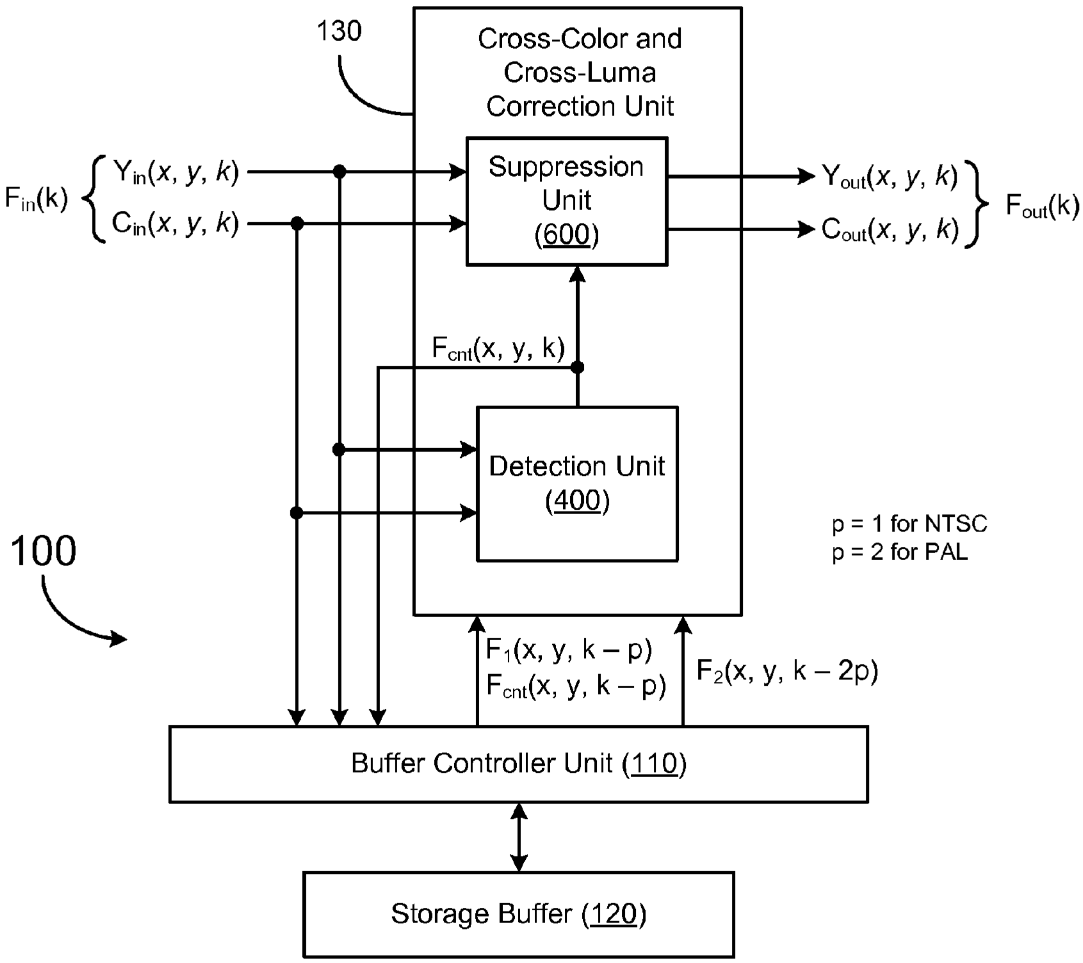
FIG. 1 is a block diagram illustrating an exemplary system for detecting and suppressing cross-color and cross-luma present in a component video signal according to one embodiment.

FIG. 1 is a block diagram illustrating an exemplary system for detecting and suppressing cross-color and cross-luma present in a component video signal according to one embodiment. The system 100 includes a CC/CL correction unit 130, a storage buffer 120 and a buffer controller unit 110. In one embodiment, the storage buffer 120 is a frame buffer that stores data including pixel data associated with a plurality of pixels in a plurality of frames. The buffer controller unit 110 is configured to manage, e.g., store and retrieve, the data stored in the storage buffer 120.

The CC/CL correction unit 130 includes a detection unit 400 that is configured to detect cross-luma and/or cross-color in a component video signal and a suppression unit 600 configured to suppress the detected cross-luma and/or cross-color. The function of each unit 400, 600 will now be described in conjunction with FIG. 2, which is a flowchart of an exemplary method for detecting and suppressing cross-color and cross-luma present in a component video signal according to one embodiment.

Figure 2:
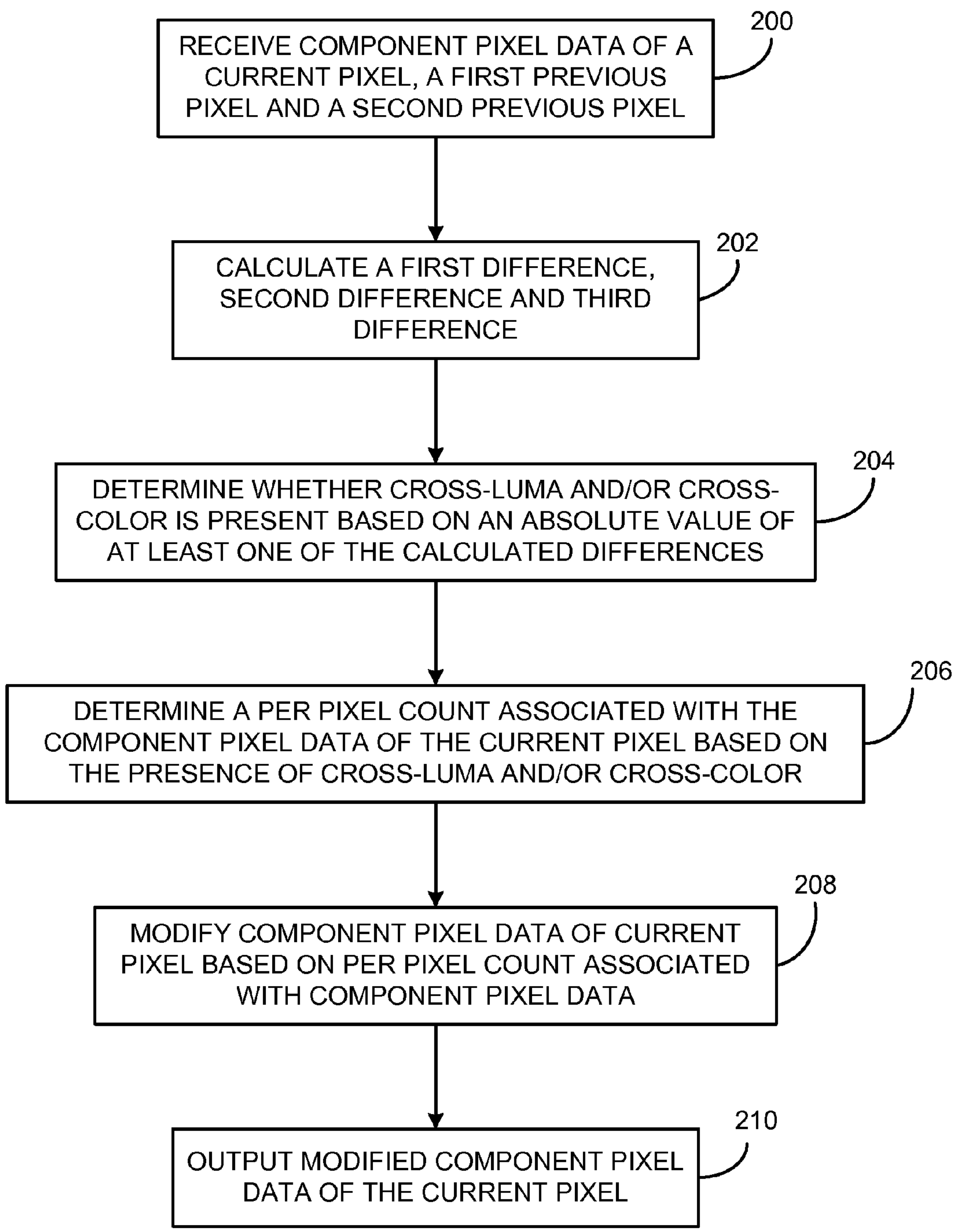
FIG. 2 is a flowchart of an exemplary method for detecting and suppressing cross-color and cross-luma present in a component video signal according to one embodiment.

Referring to FIG. 1 and FIG. 2, the exemplary method begins by receiving component pixel data of a current pixel, e.g., $F_{in}$, located in a current position, e.g., "x," in a current scan line, e.g., "y," in a current frame, e.g., "k," component pixel data of a first previous pixel, e.g., $F_1$, located in the current position in the current scan line in a first frame, and component pixel data of a second previous pixel, e.g., $F_2$, located in the current position in the current scan line in a second frame (block 200). In one embodiment, the second frame temporally precedes the first frame, which temporally precedes the current frame. The component pixel data of each of the current, first previous, and second previous pixels includes luma pixel data, Y, and chroma pixel data, C. Although typically, the chroma pixel data comprises two color difference components, e.g., Cb and Cr, for purposes of this disclosure, the term chroma pixel data will be used to refer to either or both of the two color difference components. In other words, the term chroma pixel data, C, includes the two color difference components, e.g., Cb and Cr, individually and collectively.

According to an exemplary embodiment, the system 100 includes means for receiving the input component pixel data of the current pixel, first previous pixel and the second previous pixel. For example, the CC/CL correction unit 130 can be configured for receiving the aforementioned pixel data. In one embodiment, the component pixel data of the first previous pixel and the second previous pixel are stored in the storage buffer 120, and the data buffer controller unit 110 can be configured to retrieve the component pixel data from the buffer 120 and to pass it to the CC/CL correction unit 130. Moreover, the buffer controller unit 110 can also receive the component pixel data of the current pixel, $Y_{in}(k)$ and $C_{in}(k)$, and store it in the storage buffer 120.

According to an exemplary embodiment, component pixel data of the first previous pixel in the first frame, $F_1$, and the second previous pixel in the second frame, $F_2$, are used to determine whether cross-color and/or cross-luma is present for the current pixel in the current frame, $F_{in}$. The temporal difference between the current frame, $F_{in}$, and the first previous frame, $F_1$, and between the first previous frame, $F_1$, and the second previous frame, $F_2$, is determined by the analog video standard implemented. For instance, in NTSC systems, the chroma subcarrier frequency is chosen so that its phase rotates by 180 degrees between successive scan lines. Because each video frame has an odd number of scan lines, e.g., 525 scan lines, the chroma subcarrier phase also rotates by 180 degrees between successive frames. Alternatively, in PAL systems, the chroma subcarrier frequency is chosen so that its phase rotates by substantially 90 degrees or 270 degrees between successive scan lines. Because each video frame has an odd number of scan lines, e.g., 625 scan lines, the chroma subcarrier phase also rotates by 90 degrees or 270 degrees between successive frames. Accordingly, in PAL systems, the chroma subcarrier phase rotates by 180 degrees between successive frames that are two frames apart.

When cross-color is present in an NTSC composite video signal, the luma signal is mistakenly decoded as the chroma signal. The phase rotation causes the erroneously decoded luma signal to oscillate between two complementary colors such as green and magenta, or blue and yellow at a rate of two frames per cycle. That is, the luma signal appears to be a spectral energy that oscillates between two complementary colors represented by chroma signals 180 degrees out of phase with one another. Similarly, when cross-luma is present, the chroma signal is mistakenly decoded as the luma signal. The phase rotation causes the erroneously decoded chroma signal to oscillate between two darker and brighter values at a rate of two frames per cycle. That is, the chroma signal appears to be a spectral energy that oscillates between two brightness levels represented by fluctuations in the luma signal 180 degrees out of phase with one another.

Alternatively, when cross-color is present in a PAL composite video signal, the phase rotation causes the erroneously decoded luma signal to oscillate between two complementary colors at a rate of four, as opposed to two, frames per cycle. Similarly, when cross-luma is present, the phase rotation causes the erroneously decoded chroma signal to oscillate between two darker and brighter values at rate of four frames per cycle.

Thus, in NTSC systems where the frame rate is approximately 30 Hz, the cross-color and/or cross-luma, if present, will oscillate at approximately 15 Hz. Accordingly, cross-color and/or cross-luma can be detected by analyzing the component pixel data in a detection window 300*a* that includes the current frame and at least two previous frames immediately preceding the current frame (see FIG. 3A). That is, in NTSC systems, the temporal difference between the current and first previous frames, and the first previous and second previous frames is one frame.

Alternatively, in PAL systems where the frame rate is approximately 25 Hz, the cross-color and/or cross-luma, if present, will oscillate at approximately 6.25 Hz. Thus, cross-color and/or cross-luma can be detected by analyzing the component pixel data in a detection window 300*b* that includes the current frame, and at least two previous frames where the first of the two previous frames precedes the current frame by two frames and the second previous frame precedes the current frame by four frames (see FIG. 3B). That is, in PAL systems, the temporal difference between the current and first previous frames, and the first previous and second previous frames is two frames.

Referring again to FIG. 2, after the component pixel data of the current pixel, of the first previous pixel and of the second previous pixel are received, the exemplary method continues by calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel (block 202). Thereafter, it is determined whether at least one of cross-luma and cross-color is present for the current pixel based on an absolute value of at least one of the first difference, the second difference and the third difference (block 204). According to an exemplary embodiment, the CC/CL correction unit 130 includes means for calculating the first, second and third differences, and for determining whether cross-luma and/or cross-color is present. For example, the detection unit 400 can be configured to perform this function.

Figure 4:
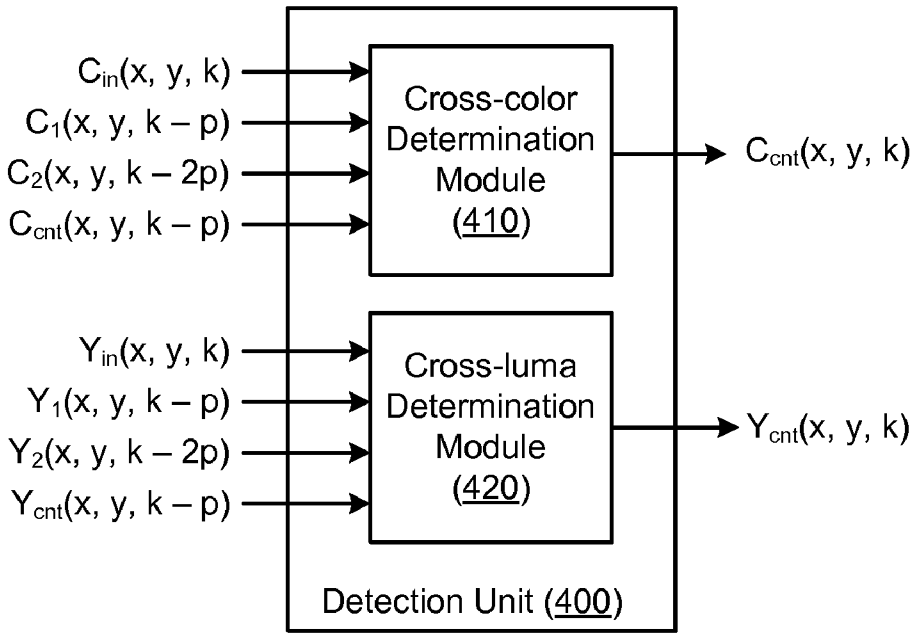
FIG. 4 is a block diagram depicting an exemplary detection unit according to one embodiment.

FIG. 4 is a block diagram depicting an exemplary detection unit 400 according to one embodiment. The detection unit 400 includes a cross-color determination module 410 and a cross-luma determination module 420. According to one embodiment, the cross-color determination module 410 and cross-luma determination module 420 receive and process the chroma pixel data, C, and the luma pixel data Y, respectively, of the current, the first previous and the second previous pixels.

As stated above, the chroma pixel data, C, represents two color difference components, e.g., Cb pixel data and Cr pixel data. In this discussion, the cross-color determination module 410 can be either a Cb cross-color determination sub-module that receives and processes the Cb pixel data of the chroma pixel data, or a Cr cross-color determination sub-module that receives and processes the Cr pixel data. In either case, unless otherwise noted, the operation of the Cb and Cr cross-color determination sub-modules is identical to that of the cross-color determination module 410. Accordingly, for the sake of clarity, the cross-color determination module 410 will be described generally in relation to chroma pixel data, C, with an understanding that the chroma pixel data, C, can be either Cb pixel data or Cr pixel data.

According to one embodiment, the cross-color determination module 410 calculates a first chroma pixel data difference, $\Delta C_1$, by subtracting the chroma pixel data of the first previous pixel, $C_1$, from the chroma pixel data of the current pixel, $C_{in}$, a second chroma pixel data difference, $\Delta C_2$, by subtracting the chroma pixel data of the second previous pixel, $C_2$, from $C_1$, and a third chroma pixel data difference, $\Delta C_3$, by subtracting $C_2$ from $C_{in}$. Similarly, the cross-luma determination module 420 calculates a first luma pixel data difference, $\Delta Y_1$, by subtracting the luma pixel data of the first previous pixel, $Y_1$, from the luma pixel data of the current pixel, $Y_{in}$, a second luma pixel data difference, $\Delta Y_2$, by subtracting the luma pixel data of the second previous pixel, $Y_2$, from $Y_1$, and a third luma pixel data difference, $\Delta Y_3$, by subtracting $Y_2$ from $Y_{in}$. The cross-color determination module 410 and the cross-luma determination module 420 are configured, in one embodiment, to detect characteristic patterns of cross-color and cross luma, respectively, based on the chroma pixel data differences and on the luma pixel data differences, respectively.

Figure 5A:
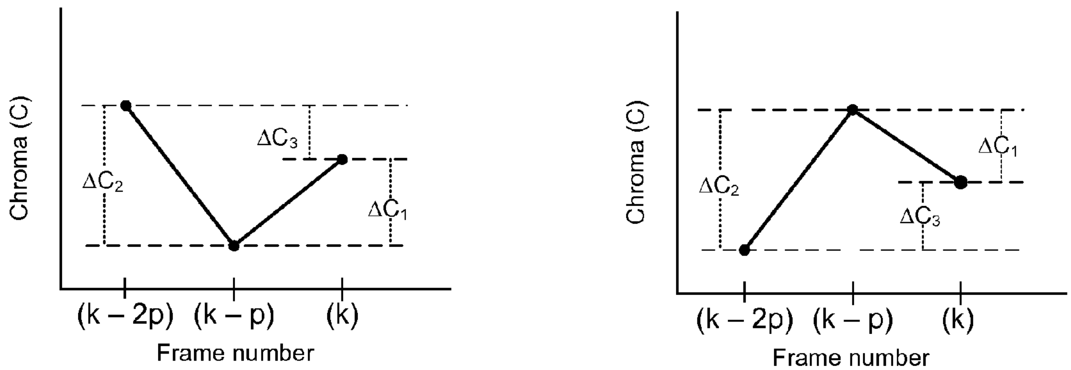
FIG. 5A depicts characteristic cross-color or cross-luma pixel data patterns.

For example, the chroma pixel data of the current, first previous and second previous pixels form a characteristic cross-color pattern when the chroma pixel data of the current, first previous and second previous pixels form a high-low-high pattern or a low-high-low pattern, as depicted in FIG. 5A. That is, the characteristic cross-color pattern can be defined by one of two conditions:

$$\Delta C_1>0 \text{ and } \Delta C_2<0; \text{ or } \Delta C_1<0 \text{ and } \Delta C_2>0.$$

Similarly, the luma pixel data of the current, first previous and second previous pixels form a characteristic cross-luma pattern when the luma pixel data of the current, first previous and second previous pixels form a high-low-high pattern or a low-high-low pattern. That is, the characteristic cross-luma pattern can be defined by one of two conditions:

$$\Delta Y_1>0 \text{ and } \Delta Y_2<0; \text{ or } \Delta Y_1<0 \text{ and } \Delta Y_2>0.$$

Figure 5B:
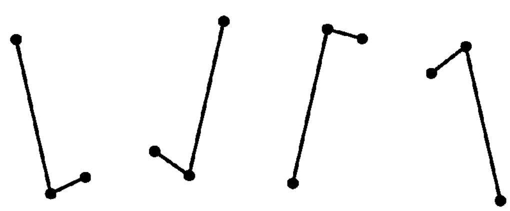
FIG. 5B depicts several cases where a set of pixel data values satisfy the characteristic pattern but may not in fact be associated with cross-luma or cross-color.

In addition to detecting the characteristic patterns of cross-color and cross luma, the cross-color determination module 410 and the cross-luma determination module 420 impose at least one additional condition in order to reduce the likelihood of a false detection event based solely on the characteristic patterns of cross-color and cross luma. For example, FIG. 5B depicts several cases where a set of pixel data values satisfy the characteristic pattern, but that may not in fact be associated with cross-luma or cross-color. According to one embodiment, in addition to satisfying one of the two conditions presented above, the following additional condition must be satisfied as well:

$$\mathrm{MAX}[\mathrm{ABS}(\Delta C_1),\mathrm{ABS}(\Delta C_2)] \leqq CP1_C \text{ (for cross-color)}$$

$$\mathrm{MAX}[\mathrm{ABS}(\Delta Y_1),\mathrm{ABS}(\Delta Y_2)] \leqq CP1_Y \text{ (for cross-luma)}$$

The first control parameters, $CP1_C$ and $CP1_Y$, are predetermined values that determine the sensitivity of the detection unit 400. For instance, as the first control parameters decrease, fewer cross-color and cross-luma events will be detected and vice versa. In one embodiment, the cross-color first control parameter $CP1_C$ and the cross-luma first control parameter $CP1_Y$ can be identical. In other embodiments, the cross-color first control parameter $CP1_C$ can differ from the cross-luma first control parameter $CP1_Y$ to reflect viewer preferences.

According to another embodiment, additional detection conditions can be imposed to increase reliability and robustness. For example, for a cross-color detection event to be true, the following additional conditions can be imposed:

$$\mathrm{MAX}\{\mathrm{MIN}[\mathrm{ABS}(\Delta C_1),\mathrm{ABS}(\Delta C_2)]/2^{CP2C},\ \mathrm{CP3}_C\}\geqq \mathrm{ABS}(\Delta C_3);\text{ and}$$

$$\mathrm{ABS}(\Delta C_3)\leqq \mathrm{CP4}_C$$

Similarly, for a cross-luma detection event to be true, the following additional conditions can be imposed:

$$\mathrm{MAX}\{\mathrm{MIN}[\mathrm{ABS}(\Delta Y_1),\mathrm{ABS}(\Delta Y_2)]/2^{CP2Y},\ \mathrm{CP3}_Y\}\geqq \mathrm{ABS}(\Delta Y_3);\text{ and}$$

$$\mathrm{ABS}(\Delta Y_3)\leqq \mathrm{CP4}_Y$$

Figure 5C:
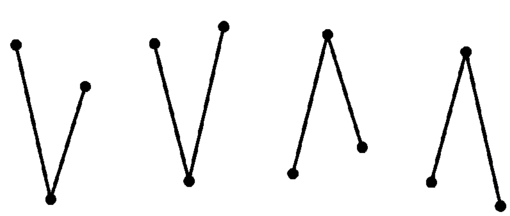
FIG. 5C depicts several cases where the set of pixel data values satisfy the characteristic pattern, as well as the additional detection conditions according to one embodiment.

Other or additional detection conditions can be imposed to customize the detection process. By imposing the additional detection conditions, what qualifies as a cross-color or cross-luma detection event can be more narrowly defined such that detection errors are minimized. For example, FIG. 5C depicts several cases where the set of pixel data values satisfy the characteristic pattern, as well as additional detection conditions. In comparison to the cases depicted in FIG. 5B, the cases in FIG. 5C are much less scattered and more indicative of the oscillating nature of cross-color and cross-luma. In contrast, while the cases depicted in FIG. 5B satisfy one of the characteristic patterns, they are more random and indicative of actual motion rather than cross-luma or cross-color. Because the cases depicted in FIG. 5B do not satisfy the additional detection conditions, they will not be mistakenly identified as cross-color or cross-luma.

Referring again to FIG. 2, after the presence of cross-luma and/or cross-color has been determined, a per pixel count associated with the component pixel data of the current pixel is determined based on the determined presence of cross-luma and/or cross-color (block 206). According to one embodiment, the component pixel data of each pixel is associated with a corresponding component per pixel count. For instance, the luma pixel data is associated with a luma per pixel count and the chroma pixel data is associated with a chroma per pixel count. The luma per pixel count and chroma per pixel count indicate, among other things, whether cross-luma and cross-color, respectively, are present for the corresponding pixel.

According to an exemplary embodiment, the CC/CL correction unit 130 includes means for determining the per pixel count associated with the component pixel data of the current pixel. In one embodiment, the cross-color determination module 410 and the cross-luma determination module 420 can be configured to perform this function. For example, when the cross-color determination module 410 determines that cross-color is present for the current pixel, the chroma per pixel count associated with the chroma pixel data of the current pixel is determined to be the chroma per pixel count associated with the chroma pixel data of the first previous pixel incremented by one (1). That is:

$$C_{cnt}(x,y,k)=C_{cnt}(x,y,k-p)+1$$

When the cross-color determination module 410 determines that cross-color is not present, the chroma per pixel count associated with the chroma pixel data of the current pixel is set to zero (0). Accordingly, the chroma per pixel count can indicate whether cross-color has been determined to be present and in how many consecutive frames cross-color has been determined to be present. In one embodiment, the cross-color determination module 410 passes the chroma per pixel count associated with the chroma pixel data of the current pixel to the buffer controller unit 110 (FIG. 1) so that the chroma per pixel count can be stored in the storage buffer 120 with the chroma pixel data of the current pixel.

Similarly, when the cross-luma determination module 420 determines that cross-luma is present, the luma per pixel count associated with the luma pixel data of the current pixel is determined to be the luma per pixel count associated with the luma pixel data of the first previous pixel incremented by one (1). That is:

$$Y_{cnt}(x,y,k)=Y_{cnt}(x,y,k-p)+1$$

When the cross-luma determination module 420 determines that cross-luma is not present, the luma per pixel count associated with the luma pixel data of the current pixel is set to zero (0). Accordingly, the luma per pixel count can indicate whether cross-luma has been determined to be present and in how many consecutive frames cross-luma has been determined to be present. In one embodiment, the cross-luma determination module 420 passes the luma per pixel count associated with the luma pixel data of the current pixel to the buffer controller unit 110 so that the luma per pixel count can be stored in the storage buffer 120 with the luma pixel data of the current pixel.

To summarize, according to the embodiments described, the cross-color determination module 410 receives and analyzes the chroma pixel data of the current pixel, $C_{in}$, and two previous pixels, $C_1$ and $C_2$, to determine whether cross-color is present for the current pixel, determines the chroma per pixel count for the current pixel, $C_{cnt}(x, y, k)$, based on the cross-color determination, and outputs the chroma per pixel count. Similarly, the cross-luma determination module 420 receives and analyzes the luma pixel data of the current pixel, $Y_{in}$, and two previous pixels, $Y_1$ and $Y_2$, to determine whether cross-luma is present, determines the luma per pixel count for the current pixel, $Y_{cnt}(x, y, k)$, based on the cross-luma determination, and outputs the luma per pixel count.

Figure 4A:
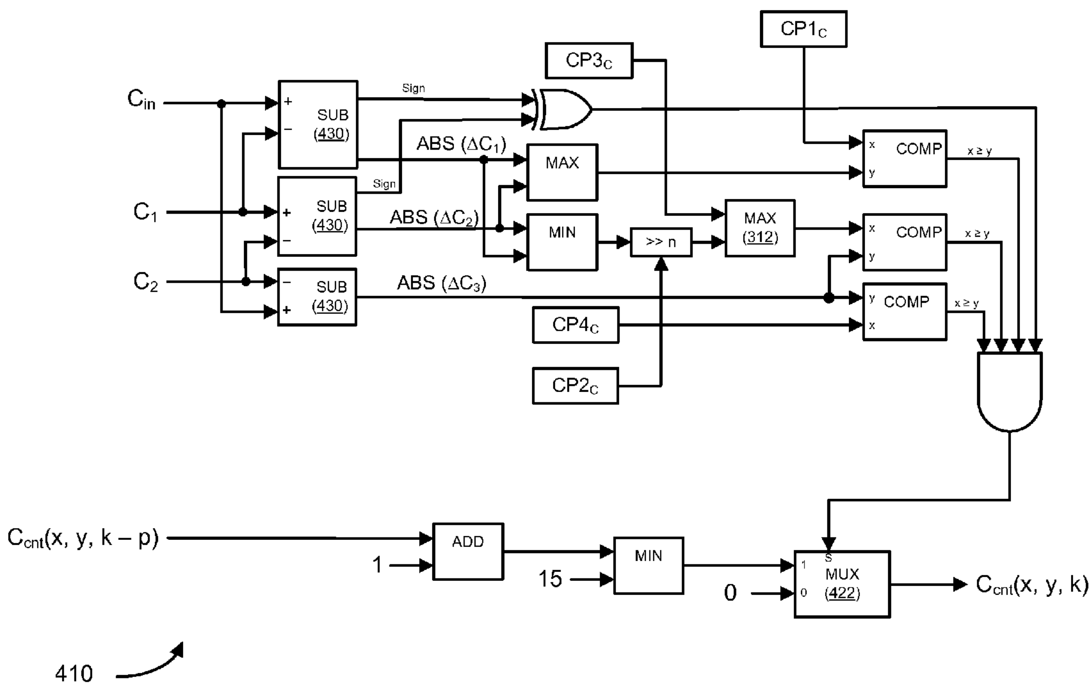
FIG. 4A and FIG. 4B are block diagrams of exemplary cross-color and cross-luma determination modules, respectively, according to one embodiment.
Figure 4B:
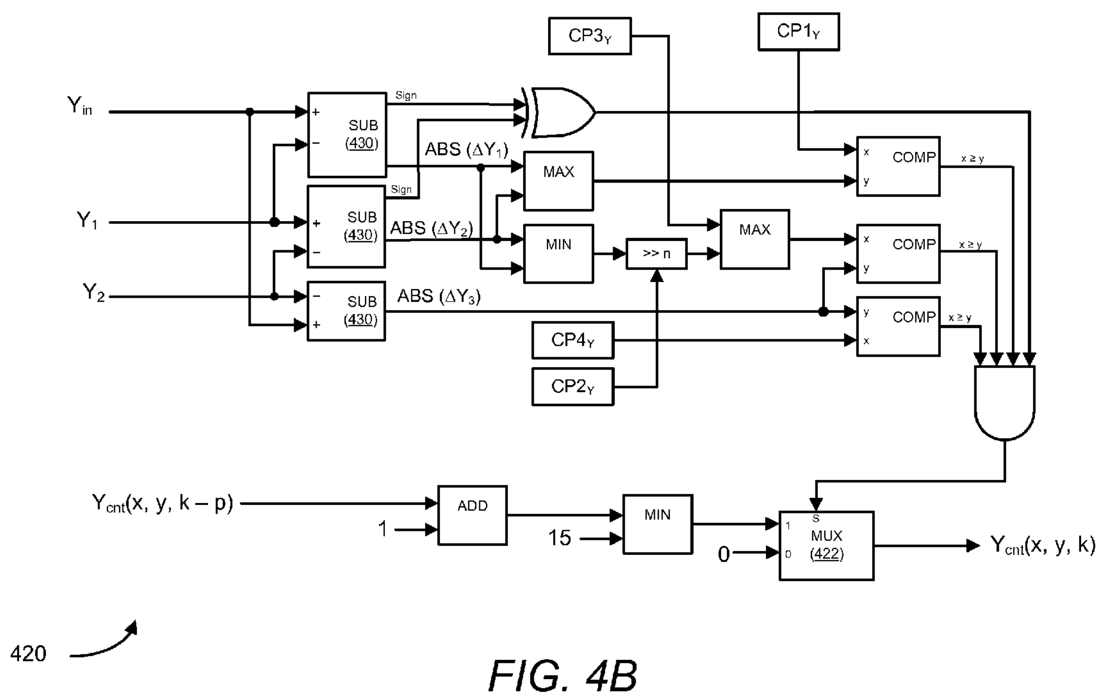

FIG. 4A and FIG. 4B are logic diagrams of exemplary cross-color 410 and cross-luma 420 determination modules, respectively, according to one embodiment. As is shown, the first, second and third differences are calculated by simple subtracting circuits 430, which output the absolute values of the first, second and third differences and the sign of the first and second differences The respective outputs are then processed and compared according to the embodiments described above to determine whether cross-color or cross-luma is present. That determination is represented by a bit value of one (1) or zero (0) that is received by a multiplexer 422, which also receives two input values.

The first input value is the per pixel count associated with the component pixel data of the first previous pixel incremented by one (1), and the second input value is zero (0). Note that the first input value saturates at a maximum value, e.g., 15, in order to reduce the number of bits necessary to represent the per pixel count. When the value of the bit received by the multiplexer 422 is one (1), meaning the presence of cross-color or cross-luma has been determined, the multiplexer 422 outputs the first input value as the luma or chroma per pixel count associated with the luma or chroma pixel data of the current pixel. Alternatively, when the value of the bit received is zero (0), meaning the presence of cross-color or cross-luma has not been determined, the multiplexer 422 outputs zero (0) as the luma or chroma per pixel count associated with the luma or chroma pixel data of the current pixel.

Referring again to FIG. 2, after determining whether cross-luma and/or cross color is present and after determining the per pixel count associated with the component pixel data of the current pixel, the exemplary method continues by modifying the component pixel data of the current pixel based on the per pixel count associated with the component pixel data (block 208). According to an exemplary embodiment, the CC/CL correction unit 130 includes a means for modifying the component pixel data of the current pixel. For example, the suppression unit 600 can be configured to perform this function.

Figure 6:
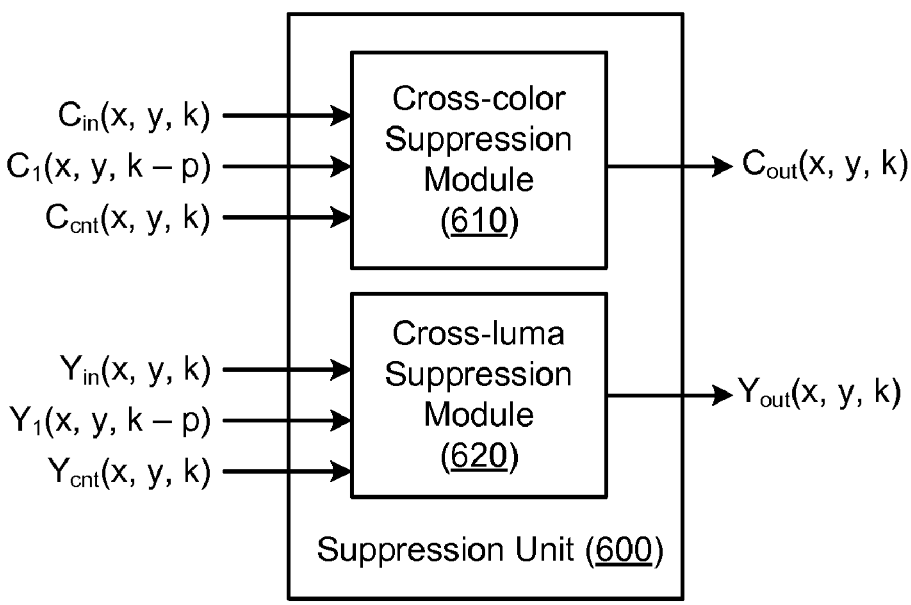
FIG. 6 is a block diagram depicting an exemplary suppression unit according to one embodiment.

FIG. 6 is a block diagram depicting an exemplary suppression unit 600 according to one embodiment. The suppression unit 600 includes a cross-color suppression module 610 and a cross-luma suppression module 620. According to one embodiment, the cross-color suppression module 610 and cross-luma suppression module 620 receive and process the chroma pixel data, C, and the luma pixel data Y, respectively, of the current, and the first previous pixels.

Similar to the cross-color determination module 410, the cross-color suppression module 610 can be either a Cb cross-color suppression sub-module that receives and processes the Cb pixel data of the chroma pixel data, or a Cr cross-color suppression sub-module that receives and processes the Cr pixel data. In either case, unless otherwise noted, the operation of the Cb and Cr cross-color suppression sub-modules is identical to that of the cross-color suppression module 610. Accordingly, for the sake of clarity, the cross-color suppression module 610 will be described generally in relation to chroma pixel data, C, with an understanding that the chroma pixel data, C, can be either Cb pixel data or Cr pixel data.

Figure 3A:
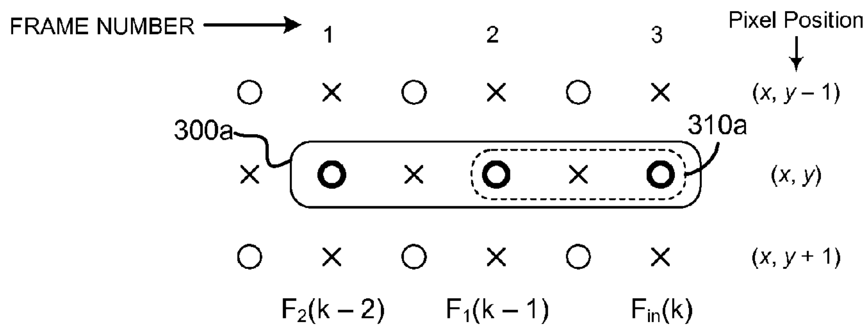
FIG. 3A and FIG. 3B depict pixels in a plurality of scan lines in a plurality of fields and detection and suppression windows according to one embodiment.
Figure 3B:
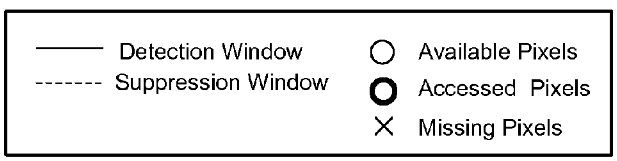
Figure 3B:
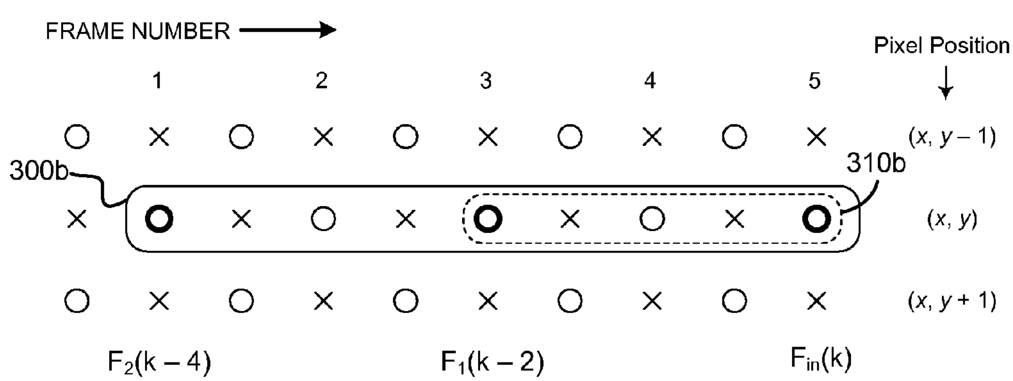

According to one embodiment, the cross-color suppression module 610 and the cross-luma suppression module 620 suppress cross-color and cross-luma, respectively, using pixels in a suppression window 310*a*, 310*b* that includes the current pixel and the first previous pixel (see FIG. 3A and FIG. 3B). In one embodiment, the cross-color suppression module 610 receives the chroma pixel data of the current pixel, $C_{in}(x, y, k)$, and the chroma pixel data of the first previous pixel, $C_1(x, y, k-p)$, and performs weighted frame averaging between the received chroma pixel data to suppress the cross-color. For example, the modified chroma pixel data of the current pixel can be calculated by the following equation:

$$C_{out}(x,y,k)=C_{in}(x,y,k)+WF_C\times[C_1(x,y,k-p)-C_{in}(x,y,k)]/2,$$

where $WF_c$ is a cross-color weighting factor having a value of at least zero (0) and at most one (1).

In one embodiment, the cross-color weighting factor is determined by the value of the chroma per pixel count associated with the chroma pixel data of the current pixel, $C_{cnt}(x, y, k)$. The cross-color weighting factor can be, in one embodiment, non-decreasing with respect to the value of the chroma per pixel count. For example, when the chroma per pixel count value is zero (0), meaning the presence of cross-color has not been determined, the value of the cross-color weighting factor can be zero (0). When the cross-color weighting factor is zero (0), frame averaging is negated, and $C_{out}(x, y, k)=C_{in}(x, y, k)$. Alternatively, when the chroma per pixel count value reaches the maximum value, meaning the presence of cross-color has been determined for a maximum number of consecutive frames including the current frame, the value of the cross-color weighting factor can be one (1). When such is the case, full frame averaging is performed, and $C_{out}(x, y, k)=[C_{in}(x, y, k)+C_1(x, y, k-p)]/2$.

Similarly, the cross-luma suppression module 620 receives the luma pixel data of the current pixel, $Y_{in}(x, y, k)$, and the luma pixel data of the first previous pixel, $Y_1(x, y, k-p)$, and performs weighted frame averaging between the received luma pixel data to suppress the cross-luma. For example, the modified luma pixel data of the current pixel can be calculated by the following equation:

$$Y_{out}(x,y,k)=Y_{in}(x,y,k)+WF_Y\times[Y_1(x,y,k-p)-Y_{in}(x,y,k)]/2,$$

where $WF_Y$ is a cross-luma weighting factor having a value of at least zero (0) and at most one (1).

In one embodiment, the cross-luma weighting factor is determined by the value of the luma per pixel count associated with the luma pixel data of the current pixel, $Y_{cnt}(x, y, k)$. The cross-luma weighting factor can be, in one embodiment, non-decreasing with respect to the value of the luma per pixel count. For example, when the luma per pixel count value is zero (0), meaning the presence of cross-luma has not been determined, the value of the cross-luma weighting factor can be zero (0), frame averaging is negated, and $Y_{out}(x, y, k)=Y_{in}(x, y, k)$. Alternatively, when the luma per pixel count value reaches the maximum value, meaning the presence of cross-luma has been determined for a maximum number of consecutive frames including the current frame, the value of the cross-luma weighting factor can be one (1), full frame averaging is performed, and $Y_{out}(x, y, k)=[Y_{in}(x, y, k)+Y_1(x, y, k-p)]/2$.

Figure 6A:
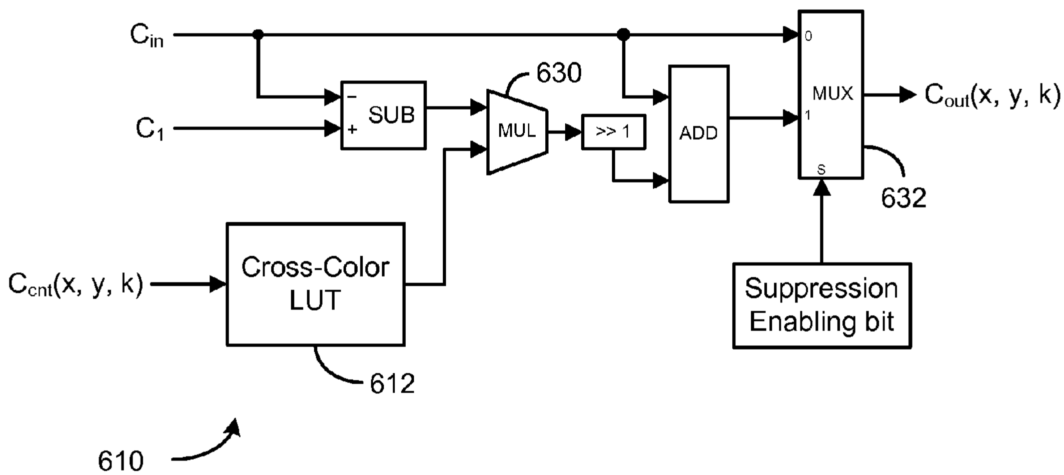
FIG. 6A and FIG. 6B are block diagrams of exemplary cross-color and cross-luma suppression modules, respectively, according to one embodiment.
Figure 6B:
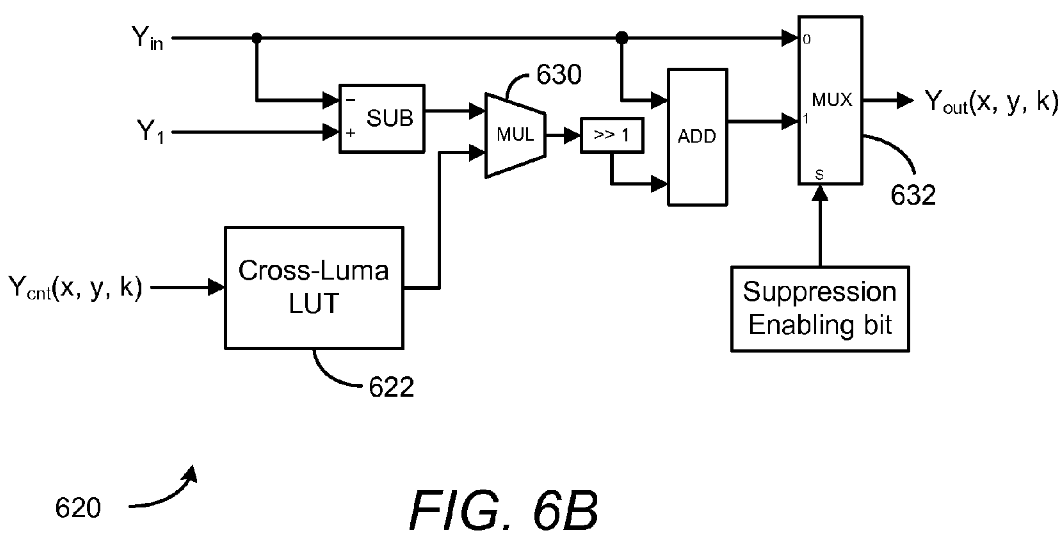

FIG. 6A and FIG. 6B are logic diagrams of exemplary cross-color 610 and cross-luma 620 suppression modules, respectively, according to one embodiment. As is shown, the cross-color suppression module 610 includes a cross-color lookup table (LUT) 612 that receives the chroma per pixel count associated with the chroma pixel data of the current pixel and outputs a cross-color weighting factor value corresponding to the chroma per pixel count. In one embodiment, the cross-color LUT 612 includes predetermined weight factor values between and including zero (0) and one (1) and the weight factor values are non-decreasing with respect to the chroma per pixel count values. Similarly, the cross-luma suppression module 620 includes a cross-luma lookup table (LUT) 622 that receives the luma per pixel count associated with the luma pixel data of the current pixel and outputs the cross-luma weighting factor value corresponding to the luma per pixel count.

In one embodiment, the cross-color weighting factor is received by a multiplier 630, which also receives a difference between the chroma pixel data of the first previous pixel and the current pixel. The product is divided by two (2) and then added to the chroma pixel data of the current pixel. In one embodiment, the modified chroma pixel data, e.g., $C_{out}(x, y, k)$, can be received by a multiplexer 632 that is controlled by a suppression enabling bit. When the enabling bit value is one (1), the multiplexer 632 outputs the modified chroma pixel data. Otherwise, when the enabling bit is zero (0), the multiplexer 632 outputs the original chroma pixel data of the current pixel.

Similarly, the cross-luma weighting factor is received by a multiplier 630, which also receives a difference between the luma pixel data of the first previous pixel and the current pixel. The product is divided by two (2) and then added to the luma pixel data of the current pixel. In one embodiment, the modified luma pixel data, e.g., $Y_{out}(x, y, k)$, can be received by a multiplexer 632 that is controlled by the suppression enabling bit. When the enabling bit value is one (1), the multiplexer 632 outputs the modified luma pixel data. Otherwise, when the enabling bit is zero (0), the multiplexer 632 outputs the original luma pixel data of the current pixel.

Referring again to FIG. 2, after the component pixel data of the current pixel is modified based on the per pixel count associated with the component pixel data, the modified component pixel data is outputted as a corrected output color video signal substantially without visual artifacts caused by cross-luma and/or cross-color (block 210). According to an exemplary embodiment, the CC/CL correction unit 130 includes means for outputting the modified component pixel data of the current pixel. For example, the suppression unit 600 can be configured to perform this task, as noted above.

Figure 7A:
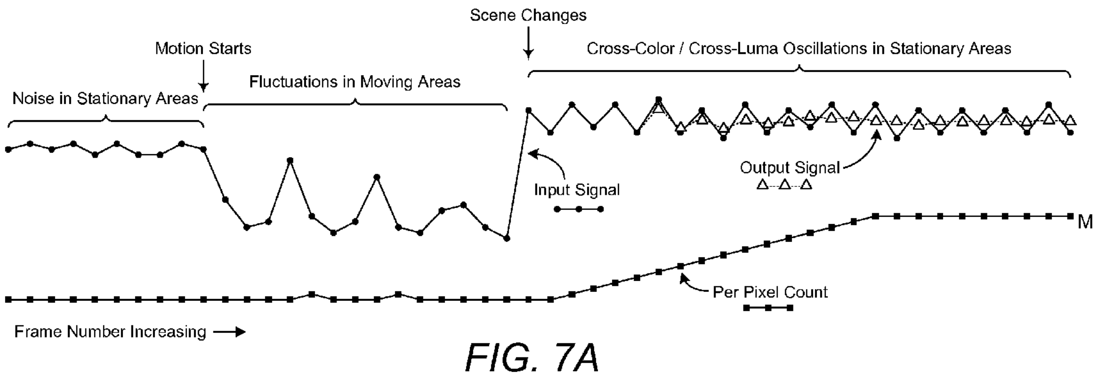
FIG. 7A and FIG. 7B are diagrams illustrating component pixel data values corresponding to pixels in a plurality of frames over a period of time.
Figure 7B:
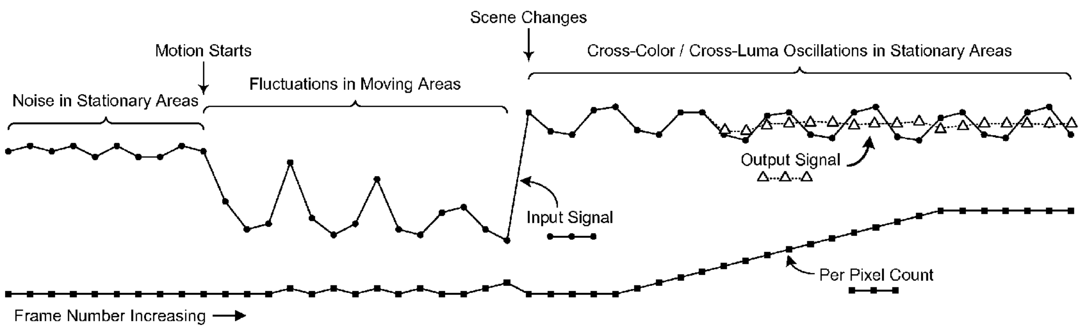

FIG. 7A and FIG. 7B are diagrams illustrating component pixel data values corresponding to pixels in a plurality of frames over a period of time. FIG. 7A depicts the response of the CC/CL correction unit 130 in an NTSC system and FIG. 7B depicts the response of the CC/CL correction unit 130 in a PAL system. In both diagrams, the input component pixel data represents three scenarios: (1) noise in a stationary area of an image; (2) fluctuations due to motion; and (3) cross-color or cross-luma in a stationary area of an image. In the first and second scenarios, the CC/CL correction unit 130 determines that cross-color or cross-luma is not present because all of the detection conditions are not satisfied. As a result, the per pixel count remains at zero (0) for the first and second scenarios, and any frame averaging is negated.

In the third scenario, the CC/CL correction unit 130 determines that cross-color or cross-luma is present, and the per pixel count incrementally increases from zero (0) to a maximum value, M. In this embodiment, weighted frame averaging begins after a delay of approximately five (5) consecutive frames to ensure that the fluctuations in the component pixel data are due to cross-color or cross-luma. Thereafter, as the per pixel count increases, the degree of frame averaging increases until full frame averaging is performed.

By averaging the component pixel data of the current pixel and the first previous pixel, the out-of-phase cross-color or cross-luma in the component video signal can effectively be cancelled, as shown in FIGS. 7A and 7B. While frame averaging successfully suppresses cross-color or cross-luma in stationary areas of an image, it can cause serious motion artifacts, e.g., blurring, smearing, and double-imaging, if improperly applied to non-stationary areas of the image. Nonetheless, because the CC/CL correction unit 130 imposes the additional detection conditions that narrowly define what qualifies as a cross-color or cross-luma detection event, the likelihood of mistakenly identifying motion as cross-color or cross-luma is greatly reduced.

The CC/CL correction unit 130, in one embodiment, can be a stand alone system 100 that includes the buffer controller unit 110 and the storage buffer 120. In this embodiment, the system 100 can be inserted between a traditional composite video signal decoder/demodulator and a traditional display device and so that the component pixel data outputted by the decoder/demodulator is intercepted by the system 100 and the outputted modified component pixel data, $F_{out}(k)$, can be received and displayed substantially without swirling rainbows, crawling dots, and other artifacts due to cross-luma or cross-color. Because the CC/CL correction unit 130 is configured to process component pixel data, the decoder/demodulator can use simple notch filters or 2-D comb filters, which are relatively inexpensive and computationally simple.

In yet another embodiment, the CC/CL correction unit 130 can be incorporated into any system that performs video signal processing, such as an image capture device, a set-top box, or a television display system. For example, the CC/CL correction unit 130 can be integrated with a de-interlacer in a television display system, where the de-interlacer converts an interlaced component video signal into a progressive component video signal which is subsequently displayed to a viewer.

Figure 8:
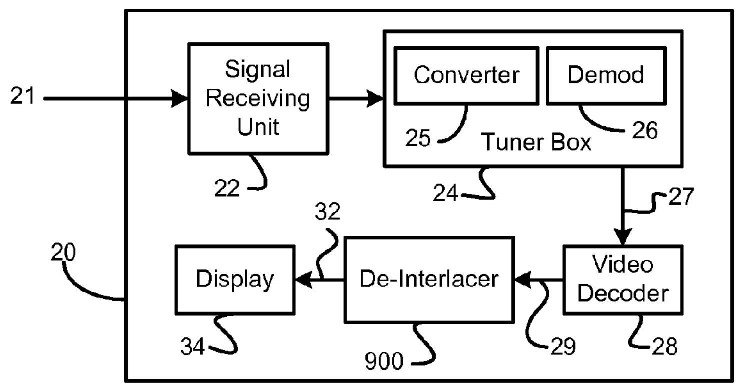
FIG. 8 is a block diagram illustrating an exemplary television display system according to one embodiment.

FIG. 8 is a block diagram illustrating an exemplary television display system according to one embodiment. The display system 20 includes a signal receiving unit 22 that is coupled to a tuner box 24, and a video decoder 28. Signals 21, such as radio-frequency (RF) television signals, are received by the signal receiving unit 22 and transmitted to the tuner box 24. The tuner box 24 includes a converter 25 and a demodulation unit 26 that transforms the incoming signal into a baseband analog composite video signal 27. The analog composite video signal 27 is received by the video decoder 28, which outputs an interlaced component video signal 29. The de-interlacer 900 converts the interlaced component video signal 29 into a progressive component video output signal 32. The progressive component video output signal 32 is then displayed via an LCD or PDP 34.

Figure 9:
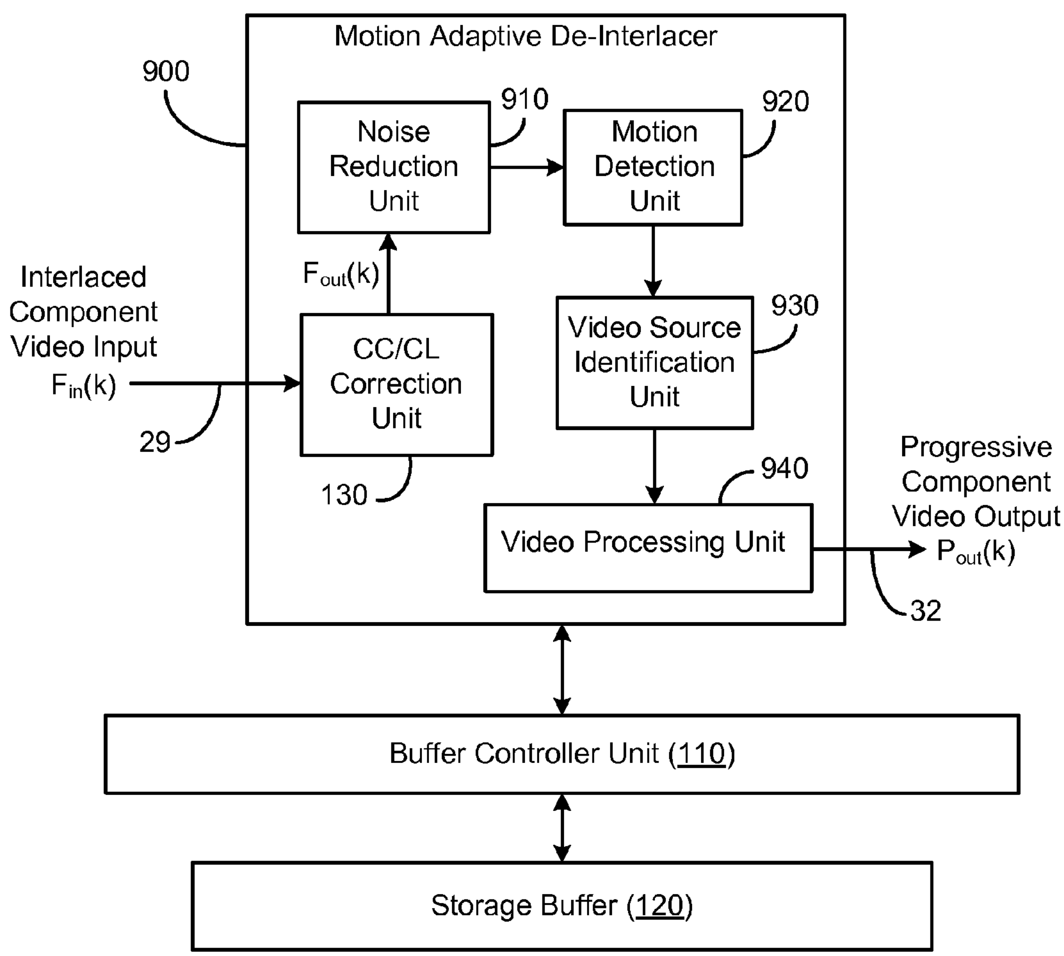
FIG. 9 is a block diagram illustrating an exemplary deinterlacing system according to one embodiment.

FIG. 9 is a block diagram illustrating an exemplary de-interlacing system according to one embodiment. The de-interlacer 900 is a 3-D motion adaptive de-interlacer that requires a buffer controller unit 110 and a storage buffer 120. In one embodiment, the de-interlacer 900 includes the CC/CL correction unit 130, a noise reduction unit 910, such as that described in co-pending U.S. application Ser. No. 11/345,739, filed Feb. 2, 2006, assigned to the assignee of the present application, and entitled "METHOD AND SYSTEM FOR REDUCING NOISE LEVEL IN A VIDEO SIGNAL," a motion detection unit 920, such as that described in co-pending U.S. application Ser. No. 11/001,826, filed Dec. 2, 2004, assigned to the assignee of the present application, and entitled "METHOD AND SYSTEM FOR DETECTING MOTION BETWEEN VIDEO FIELD OF SAME AND OPPOSITE PARITY FROM AN INTERLACED VIDEO SOURCE," a video source identification unit 920 such as that described in co-pending U.S. application Ser. No. 11/038,327, filed Jan. 19, 2005, assigned to the assignee of the present application, and entitled "METHOD AND APPARATUS FOR DE-INTERLACING INTERLACED VIDEO FIELDS ORIGINATING FROM A PROGRESSIVE VIDEO SOURCE," and a video processing unit 940 such as that described in co-pending U.S. application Ser. No. 11/019,017, filed Dec. 20, 2004, assigned to the assignee of the present application, and entitled "METHOD AND APPARATUS FOR PER-PIXEL MOTION ADAPTIVE DE-INTERLACING OF INTERLACED VIDEO FIELDS."

In one embodiment, the integrated CC/CL correction unit 130 receives the interlaced component video input signal 29, $F_{in}(k)$, automatically detects and suppresses cross-color and cross-luma artifacts present in the input signal 29, $F_{in}(k)$, and outputs the modified component pixel data, $F_{out}(k)$, to the noise reduction unit 910, which digitally reduces the noise present therein. The motion detection unit 920 receives the noise-filtered pixel data from the noise reduction unit 910 and calculates motion data related to a missing target pixel in an interlaced video field for which a value must be determined in order to generate the corresponding progressive component video signal. The motion data is received by the video source identification unit 930, which identifies the film mode of the video source based on the motion data. The video processing unit 940 receives the motion data from the motion detection unit 920 and a film mode indicator from the video source identification unit 930 and generates the progressive component video output signal 32, $P_{out}(k)$.

In this embodiment, the CC/CL correction unit 130 shares pixel data read and write modules (not shown), the buffer controller unit 110 and the external storage buffer 120 with the motion adaptive de-interlacer 900. By sharing resources that are already available, the CC/CL correction unit 130 can be implemented without unduly impacting the complexity and cost of the overall display system 20.

According to the embodiments described, the CC/CL correction unit 130 can automatically detect and suppress cross-color and cross-luma artifacts from the pixel data of a component video signal derived from a composite video signal with a quadrature-modulated chroma signal mixed with a baseband luma signal. The resulting modified component video signal can then be subsequently processed and displayed substantially without swirling rainbows, crawling dots, and other artifacts due to crosstalk between the chroma and luma channels in a composite video signal. When implemented in a display system, such as a television, the CC/CL correction unit 130 can achieve video quality close to that of a system that uses 3-D comb filters without the expense and complexity associated with such filters.

The CC/CL correction unit 130 offers several significant advantages over existing cross-color/cross-luma suppression systems. For example, the cross-luma and cross-color detection and suppression can be performed individually or simultaneously in parallel with matched delay. Moreover, the control parameters utilized by the detection unit 400 are fully programmable and can be assigned separately to achieve different behaviors for the different perception of the human eyes for cross-luma and cross-color artifacts. For instance, the detection and suppression of cross-color can be assigned to a more aggressive setting, i.e., entering into frame averaging earlier, to avoid rainbow artifacts at the expense of more color blurring, while the detection and suppression of cross-luma can be assigned to a more conservative setting, i.e., entering into frame averaging later, to avoid saw-tooth and motion blur artifacts at the expense of more crawling dots.

In addition, the CC/CL correction unit 130 performs detection and suppression only in the temporal domain, unlike most existing systems that perform filtering in the horizontal and vertical domain as well. By filtering in the temporal domain only, cross-luma and cross-color detection and suppression are independent of image scaling in the horizontal and vertical domains and de-interlacing. That is, the exemplary process can be applicable to either spatially enlarged or shrunk input video signals, and either interlaced or progressive input video signals. Moreover, because the CC/CL correction unit 130 processes baseband component video signals, it can process decoded and demodulated composite video signals, such as NTSC and PAL, as well as component video signals, such as YPbPr and YCbCr, which are originated from a composite video signal.

According to additional aspects, the CC/CL correction unit 130 can process baseband component video signals with or without chroma sub-sampling, i.e., sampling rate down conversion for the chroma signals with respect to the luma signal. For example, for YCbCr component video signals with 4:4:4 sampling format, one set of cross-luma determination 420 and suppression 620 modules is needed for the luma component Y and two sets of cross-color determination 410 and suppression 610 modules are needed for the chroma components Cb and Cr, respectively. For YCbCr component video signals with 4:2:2 sampling format, one set of cross-luma determination 420 and suppression 620 modules is needed for the luma component Y and only one set of cross-color determination 410 and suppression 610 modules is needed for both chroma components Cb and Cr, which operates in a time multiplexing mode between Cb and Cr.

In another aspect, the CC/CL correction unit 130 does not rely on detecting motion in the luma and/or chroma component signals, unlike many other existing systems that measure motion in the luma signal to detect the stillness of the input video. Instead, the CC/CL correction unit 130 detects cross-luma and cross-color directly based on their characteristic frequencies. By not relying on motion detection, erroneous cross-color and cross-luma detection events can be minimized and improper filtering can be avoided.

While memory sharing with other video processing blocks in the video signal path, such as de-interlacing, is possible and desirable, another additional benefit is that memory saving can be achieves by employing the method and system described herein. By sharing the storage buffer 120, whose size is often determined by the highest definition signal formats that the system needs to support, there is actually no additional size for the storage buffer 120 required to store the per pixel count data and the component pixel data for the CC/CL correction unit 130. This is because the size for the storage buffer 120 is often determined by the required frame buffer size for the de-interlacing and/or frame-rate conversion of the highest definition signal formats, such as 1080i or 1080p, supported by the system, without considering the need for cross-luma and cross-color detection and suppression for such high quality high-definition (HD) signals, which generally are not originated from a composite video signal. While for those lower quality standard-definition (SD) signals, such as 480i for NTSC or 576i for PAL, where cross-luma and cross-color detection and suppression are much more desired, the required frame buffer size for the de-interlacing and frame-rate conversion is much less. Hence, the CC/CL correction unit 130 utilize the spare memory space that already exists in the storage buffer 120 for the support of HD signals. Accordingly, additional space for the storage buffer 120 is not required to employ the method and system described herein for SD signals.

According to embodiments described, the cross-color and cross-luma of a baseband component video signal originated from a quadrature-modulated composite video signal can be detected and suppressed, and hence the output baseband component video signal can be correctly processed and displayed substantially without swirling rainbows, crawling dots, and other artifacts due to cross-color and cross-luma. It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for automatically detecting and suppressing cross-color and cross-luma present in a baseband component video signal, the method comprising:

receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame;

calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel;

determining for the current pixel whether at least one of cross-luma and cross-color is present based on an absolute value of at least one of the first difference, the second difference and the third difference;

determining a per pixel count associated with the component pixel data of the current pixel based on the determined presence of at least one of cross-luma and cross-color;

modifying the component pixel data of the current pixel based on the per pixel count associated with the component pixel data of the current pixel by using the per pixel count for the current pixel to determine a weighting factor, wherein the weighting factor is at least zero and at most one;

calculating an increment by subtracting the component pixel data of the current pixel from the component pixel data of the first previous pixel and dividing the difference by two;

calculating a product by multiplying the calculated increment by the weighting factor; and adding the product to the component pixel data of the current pixel; and outputting the modified component pixel data of the current pixel as a corrected output color video signal, wherein the corrected output color video signal is substantially without visual artifacts caused by the at least one of cross-luma and cross-color.

2. The method of claim 1 wherein the component pixel data comprises luma pixel data and calculating the first, second and third differences includes calculating a first luma pixel data difference by subtracting the luma pixel data of the first previous pixel from the luma pixel data of the current pixel, calculating a second luma pixel data difference by subtracting the luma pixel data of the second previous pixel from the luma pixel data of the first previous pixel, and calculating a third luma pixel data difference by subtracting the luma pixel data of the second previous pixel from the luma pixel data of the current pixel.

3. The method of claim 2 wherein determining whether at least one of cross-luma and cross-color is present includes:

defining a first condition as one where the first luma pixel data difference is greater than zero and the second luma pixel data difference is less than zero;

defining a second condition as one where the first luma pixel data difference is less than zero and the second luma pixel data difference is greater than zero; and detecting a cross-luma event when one of the first condition and the second condition is satisfied and when a greater of an absolute value of the first luma pixel data difference and the second luma pixel data difference is at most equal to a first predetermined control parameter.

4. The method of claim 3 wherein determining whether at least one of cross-luma and cross-color is present further includes:

dividing a lesser of the absolute value of the first luma pixel data difference and the second luma pixel data difference by two raised to a power of a second predetermined control parameter and comparing a result of the division to a third predetermined control parameter; and detecting a cross-luma event when a greater of the result of the division and the third predetermined control parameter is at least equal to an absolute value of the third luma pixel data difference and when the third luma pixel data difference is at most equal to a fourth predetermined control parameter.

5. The method of claim 1 wherein the component pixel data comprises chroma pixel data and calculating the first, second and third differences includes calculating a first chroma pixel data difference by subtracting the chroma pixel data of the first previous pixel from the chroma pixel data of the current pixel, calculating a second chroma pixel data difference by subtracting the chroma pixel data of the second previous pixel from the chroma pixel data of the first previous pixel, and calculating a third chroma pixel data difference by subtracting the chroma pixel data of the second previous pixel from the chroma pixel data of the current pixel.

6. The method of claim 5 wherein determining whether at least one of cross-luma and cross-color is present includes:

defining a first condition as one where the first chroma pixel data difference is greater than zero and the second chroma pixel data difference is less than zero;

defining a second condition as one where the first chroma pixel data difference is less than zero and the second chroma pixel data difference is greater than zero; and detecting a cross-color event when one of the first condition and the second condition is satisfied and when a greater of an absolute value of the first chroma pixel data difference and the second chroma pixel data difference is at most equal to a first predetermined control parameter.

7. The method of claim 6 wherein determining whether at least one of cross-luma and cross-color is present further includes:

dividing a lesser of the absolute value of the first chroma pixel data difference and the second chroma pixel data difference by two raised to a power of a second predetermined control parameter and comparing a result of the division to a third predetermined control parameter; and detecting a cross-color event when a greater of the result of the division and the third predetermined control parameter is at least equal to an absolute value of the third chroma pixel data difference and when the third chroma pixel data difference is at most equal to a fourth predetermined control parameter.

8. The method of claim 1 wherein modifying the component pixel data comprises performing weighted frame averaging between the component pixel data of the current pixel and the component pixel data of the first previous pixel.

9. The method of claim 1 wherein the component pixel data includes luma pixel data and chroma pixel data and determining the per pixel count associated with the component pixel data of the current pixel includes:

receiving a luma per pixel count and a chroma per pixel count associated with the luma pixel data and the chroma pixel data, respectively, of the first previous pixel;

incrementing the luma per pixel count for the first previous pixel when a cross-luma event is determined for the current pixel;

setting the luma per pixel count for the current pixel to zero when a cross-luma event is not determined for the current pixel;

incrementing the chroma per pixel count for the first previous pixel when a cross-color event is determined for the current pixel; and setting the chroma per pixel count for the current pixel to zero when a cross-color event is not determined for the current pixel.

10. The method of claim 1 wherein using the per pixel count to determine the weighting factor includes utilizing at least one lookup table comprising a plurality of predetermined weighting factors associated with a plurality of per pixel count values.

11. A system for automatically detecting and suppressing cross-color and cross-luma present in a baseband component video signal, the system comprising:

means for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame;

means for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel;

means for determining for the current pixel whether at least one of cross-luma and cross-color is present based on an absolute value of at least one of the first difference, the second difference and the third difference;

means for determining a per pixel count associated with the component pixel data of the current pixel based on the determined presence of at least one of cross-luma and cross-color;

means for modifying the component pixel data of the current pixel based on the per pixel count associated with the component pixel data of the current pixel by using the per pixel count for the current pixel to determine a weighting factor, wherein the weighting factor is at least zero and at most one, calculating an increment by subtracting the component pixel data of the current pixel from the component pixel data of the first previous pixel and dividing the difference by two, calculating a product by multiplying the calculated increment by the weighting factor, and by adding the product to the component pixel data of the current pixel, and for outputting the modified component pixel data of the current pixel as a corrected output color video signal, wherein the corrected output color video signal is substantially without visual artifacts caused by at least one of cross-luma and cross-color.

12. A system for automatically detecting and suppressing cross-color and cross-luma present in a baseband component video signal, the system comprising:

a correction unit configured for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame;

a detection unit configured for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, for determining for the current pixel whether at least one of cross-luma and cross-color is present based on an absolute value of at least one of the first difference, the second difference and the third difference, and for determining a per pixel count associated with the component pixel data of the current pixel based on the determined presence of at least one of cross-luma and cross-color; and a suppression unit configured for modifying the component pixel data of the current pixel based on the per pixel count associated with the component pixel data of the current pixel by using the per pixel count for the current pixel to determine a weighting factor, wherein the weighting factor is at least zero and at most one, calculating an increment by subtracting the component pixel data of the current pixel from the component pixel data of the first previous pixel and dividing the difference by two, calculating a product by multiplying the calculated increment by the weighting factor, and by adding the product to the component pixel data of the current pixel, and for outputting the modified component pixel data of the current pixel as a corrected output color video signal, wherein the corrected output color video signal is substantially without visual artifacts caused by at least one of cross-luma and cross-color.

13. The system of claim 12 wherein the component pixel data comprises luma pixel data and the detection unit is further configured for calculating a first luma pixel data difference by subtracting the luma pixel data of the first previous pixel from the luma pixel data of the current pixel, calculating a second luma pixel data difference by subtracting the luma pixel data of the second previous pixel from the luma pixel data of the first previous pixel, and calculating a third luma pixel data difference by subtracting the luma pixel data of the second previous pixel from the luma pixel data of the current pixel.

14. The system of claim 13 wherein the detection unit is further configured for defining a first condition as one where the first luma pixel data difference is greater than zero and the second luma pixel data difference is less than zero, for defining a second condition as one where the first luma pixel data difference is less than zero and the second luma pixel data difference is greater than zero, and for detecting a cross-luma event when one of the first condition and the second condition is satisfied and when a greater of an absolute value of the first luma pixel data difference and the second luma pixel data difference is at most equal to a first predetermined control parameter.

15. The system of claim 14 wherein the detection unit is further configured for dividing a lesser of the absolute value of the first luma pixel data difference and the second luma pixel data difference by two raised to a power of a second predetermined control parameter and comparing a result of the division to a third predetermined control parameter, and for detecting a cross-luma event when a greater of the result of the division and the third predetermined control parameter is at least equal to an absolute value of the third luma pixel data difference and when the third luma pixel data difference is at most equal to a fourth predetermined control parameter.

16. The system of claim 12 wherein the component pixel data comprises chroma pixel data and the detection unit is configured for calculating a first chroma pixel data difference by subtracting the chroma pixel data of the first previous pixel from the chroma pixel data of the current pixel, calculating a second chroma pixel data difference by subtracting the chroma pixel data of the second previous pixel from the chroma pixel data of the first previous pixel, and calculating a third chroma pixel data difference by subtracting the chroma pixel data of the second previous pixel from the chroma pixel data of the current pixel.

17. The system of claim 16 wherein the detection unit is configured for defining a first condition as one where the first chroma pixel data difference is greater than zero and the second chroma pixel data difference is less than zero, for defining a second condition as one where the first chroma pixel data difference is less than zero and the second chroma pixel data difference is greater than zero, and for detecting a cross-color event when one of the first condition and the second condition is satisfied and when a greater of an absolute value of the first chroma pixel data difference and the second chroma pixel data difference is at most equal to a first predetermined control parameter.

18. The system of claim 17 wherein the detection unit is configured for dividing a lesser of the absolute value of the first chroma pixel data difference and the second chroma pixel data difference by two raised to a power of a second predetermined control parameter and comparing a result of the division to a third predetermined control parameter, and for detecting a cross-color event when a greater of the result of the division and the third predetermined control parameter is at least equal to an absolute value of the third chroma pixel data difference and when the third chroma pixel data difference is at most equal to a fourth predetermined control parameter.

19. The system of claim 12 wherein the suppression unit is further configured for performing weighted frame averaging between the component pixel data of the current pixel and the component pixel data of the first previous pixel.

20. The system of claim 12 wherein the component pixel data includes luma pixel data and chroma pixel data and the detection unit is further configured for receiving a luma per pixel count and a chroma per pixel count associated with the luma pixel data and the chroma pixel data, respectively, of the first previous pixel, for incrementing the luma per pixel count for the first previous pixel when a cross-luma event is determined for the current pixel, for setting the luma per pixel count for the current pixel to zero when a cross-luma event is not determined for the current pixel, for incrementing the chroma per pixel count for the first previous pixel when a cross-color event is determined for the current pixel, and for setting the chroma per pixel count for the current pixel to zero when a cross-color event is not determined for the current pixel.

21. The system of claim 12 wherein the suppression unit is configured for using the per pixel count to determine the weighting factor by utilizing at least one lookup table comprising a plurality of predetermined weighting factors associated with a plurality of per pixel count values.

22. A progressive scan display system comprising:

a signal receiving unit;

a tuner box for transforming the signal into a baseband analog composite video signal;

a video decoder for transforming the analog signal into an interlaced component video signal comprising component pixel data;

a motion adaptive de-interlacing system for converting the interlaced component video signal into a progressive component video signal, wherein the de-interlacing system includes:

a cross-color and cross-luma correction unit configured for receiving component pixel data of a current pixel located in a current position in a current scan line in a current frame, the component pixel data of a first previous pixel located in the current position in the current scan line in a first frame, and the component pixel data of a second previous pixel located in the current position in the current scan line in a second frame, wherein the second frame temporally precedes the first frame, which temporally precedes the current frame;

a detection unit configured for calculating a first difference based on the component pixel data of the first previous pixel and the component pixel data of the current pixel, a second difference based on the component pixel data of the second previous pixel and the component pixel data of the first previous pixel, and a third difference based on the component pixel data of the second previous pixel and the component pixel data of the current pixel, for determining for the current pixel whether at least one of cross-luma and cross-color is present based on an absolute value of at least one of the first difference, the second difference and the third difference, and for determining a per pixel count associated with the component pixel data of the current pixel based on the determined presence of at least one of cross-luma and cross-color; and a suppression unit configured for modifying the component pixel data of the current pixel based on the per pixel count associated with the component pixel data of the current pixel by using the per pixel count for the current pixel to determine a weighting factor, wherein the weighting factor is at least zero and at most one, calculating an increment by subtracting the component pixel data of the current pixel from the component pixel data of the first previous pixel and dividing the difference by two, calculating a product by multiplying the calculated increment by the weighting factor, and by adding the product to the component pixel data of the current pixel, and for outputting the modified component pixel data of the current pixel as a corrected output color video signal, wherein the corrected output color video signal is substantially without visual artifacts caused by at least one of cross-luma and cross-color; and a display for displaying the progressive video signal.

* * * * *